US010941992B2

(12) United States Patent
Mironets et al.

(10) Patent No.: US 10,941,992 B2
(45) Date of Patent: Mar. 9, 2021

(54) HEAT EXCHANGER

(71) Applicant: Hamilton Sundstrand Corporation, Charlotte, NC (US)

(72) Inventors: Sergey Mironets, Charlotte, NC (US); Vijay Narayan Jagdale, South Windsor, CT (US); Colette O. Fennessy, West Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 150 days.

(21) Appl. No.: 16/036,657

(22) Filed: Jul. 16, 2018

(65) Prior Publication Data

US 2018/0328676 A1  Nov. 15, 2018

Related U.S. Application Data

(62) Division of application No. 15/478,399, filed on Apr. 4, 2017, now Pat. No. 10,094,628.

(51) Int. Cl.
*B22F 3/105* (2006.01)
*B22F 5/10* (2006.01)
(Continued)

(52) U.S. Cl.
CPC ............ *F28F 19/00* (2013.01); *B22F 3/1055* (2013.01); *B22F 5/10* (2013.01); *B23K 26/342* (2015.10); *B23K 26/702* (2015.10); *B28B 1/001* (2013.01); *B28B 17/0081* (2013.01); *B29C 64/153* (2017.08); *B29C 64/282* (2017.08);
(Continued)

(58) Field of Classification Search
CPC ...... B22F 3/1055; B22F 5/10; B23K 2101/14; B23K 26/342; B23K 26/702; B28B 1/001; B28B 17/0081; B29C 64/153; B29C 64/282; B29C 64/295; B29C 64/386; B29L 2031/18; B33Y 10/00; B33Y 80/00;
(Continued)

(56) References Cited

U.S. PATENT DOCUMENTS 6,708,869 B2 *  3/2004  Hyogo ................. B23K 35/286
                                                                    228/183
9,914,282 B2    3/2018  Roach et al.
(Continued)

FOREIGN PATENT DOCUMENTS

EP    3012436 A1    4/2016
EP    3073217 A1    9/2016

OTHER PUBLICATIONS

Craig Leising, Powder Coating Finish Measurement Using 3D Profilometry, 2013, Nanobea, http://nanovea.com/App-Notes/powder-coating-finish-measurement.pdf (Year: 2013).*
(Continued)

*Primary Examiner* — Edward F Landrum
*Assistant Examiner* — Chang H Park
(74) *Attorney, Agent, or Firm* — Cantor Colburn LLP

(57) ABSTRACT

A heat exchanger includes a core having a plurality of first layers for receiving a first fluid and at least one header arranged in fluid communication with the plurality of first layers. The at least one header is integrally formed ith the core via an additive manufacturing process. The header has a first microstructure and the core has a second, different microstructure.

9 Claims, 6 Drawing Sheets

(51) Int. Cl.

| | |
|---|---|
| *B23K 101/14* | (2006.01) |
| *B23K 26/342* | (2014.01) |
| *B23K 26/70* | (2014.01) |
| *B28B 1/00* | (2006.01) |
| *B28B 17/00* | (2006.01) |
| *B29C 64/153* | (2017.01) |
| *B29C 64/282* | (2017.01) |
| *B29C 64/295* | (2017.01) |
| *B29C 64/386* | (2017.01) |
| *B29L 31/18* | (2006.01) |
| *B33Y 10/00* | (2015.01) |
| *B33Y 80/00* | (2015.01) |
| *F28D 1/00* | (2006.01) |
| *F28D 1/053* | (2006.01) |
| *F28F 19/00* | (2006.01) |

(52) U.S. Cl.
CPC .......... *B29C 64/295* (2017.08); *B29C 64/386* (2017.08); *F28D 1/00* (2013.01); *F28D 1/05316* (2013.01); *B23K 2101/14* (2018.08); *B29L 2031/18* (2013.01); *B33Y 10/00* (2014.12); *B33Y 80/00* (2014.12); *F28F 2255/18* (2013.01); *F28F 2260/00* (2013.01)

(58) Field of Classification Search
CPC ........ F28D 1/00; F28D 1/05316; F28F 19/00; F28F 2255/18; F28F 2260/00
See application file for complete search history.

(56) References Cited

U.S. PATENT DOCUMENTS

| | | |
|---|---|---|
| 2005/0148115 A1 | 7/2005 | Williams et al. |
| 2015/0321422 A1 | 11/2015 | Boyer |
| 2016/0114425 A1 | 4/2016 | Liu |
| 2016/0265850 A1 | 9/2016 | Kupiszewski et al. |
| 2016/0305718 A1* | 10/2016 | Donovan ................ B23P 15/26 |

OTHER PUBLICATIONS

Gobetz et al., Utilization of Additive Manufacturing for Aerospace Heat Exchangers, Feb. 29, 2016, Applied Research Laboratory, https://apps.dtic.mil/dtic/tr/fulltext/u2/1010878.pdf (Year: 2016).*

Partial European Search Report; International Application No. 18165657.0-1008; International Filing Date: Apr. 4, 2018; dated Sep. 20, 2018; 12 pages.

European Office Action; International Application No. 18165657.0-1008; International Filing Date: Apr. 4, 2018; dated May 20, 2020; 24 pages.

* cited by examiner

HEAT EXCHANGER

CROSS-REFERENCE TO RELATED APPLICATIONS

This application is a divisional of U.S. application Ser. No. 15/478,399, filed Apr. 4, 2017, which is incorporated herein by reference in its entirety.

BACKGROUND

Exemplary embodiments of this invention generally relate to heat exchangers and, more particularly, to methods of manufacturing a heat exchanger.

Heat exchangers are devices built for transferring heat from one fluid to another. The fluids may be separated by a solid wall or other divider that keeps them from mixing. Heat exchangers are commonly used in refrigeration, air conditioning, space heating, electricity generation, and chemical processing. Heat exchangers find use in at least the aerospace and automobile industries.

Heat exchangers are typically required to function in extreme conditions, with varying operating profiles. Each section or component of a heat exchanger is susceptible to a different failure mode. For example, the headers or manifolds of the heat exchanger are more likely to fail as a result of creep and the core of the heat exchanger is more likely to fail due to fatigue. Conventional heat exchangers are typically overdesigned to withstand the potential damage from the cumulative effects of the plurality of failure mechanisms. However, overdesign of the heat exchanger results in increased size and weight of the heat exchanger, thus resulting in a more costly and less efficient unit.

BRIEF DESCRIPTION

According to an embodiment, a method of manufacturing a component susceptible to multiple failure modes includes generating a stereolithography file including a geometry of the component. The geometry of the stereolithography file is divided into a plurality of layers. Each of the layers includes a first portion and a second portion of the component. Energy from an energy source is applied to a powdered material such that the powdered material fuses to form the first portion and the second portion of each of the plurality of layers. Applying energy from the energy source to form the first portion of the plurality of layers includes operating the energy source with a first set of parameters and applying energy from the energy source to form the second portion of the plurality of layers includes operating the energy source with a second set of parameters. The second set of parameters is different from the first set of parameters.

In addition to one or more of the features described above, or as an alternative, in further embodiments the first portion of the component is susceptible to creep.

In addition to one or more of the features described above, or as an alternative, in further embodiments the second portion of the component is susceptible to fatigue due to thermal and load cycling.

In addition to one or more of the features described above, or as an alternative, in further embodiments operating the energy source with a first set of parameters forms the first portion of the component with a first microstructure and operating the energy source with a second set of parameters forms the second portion of the component with a second microstructure.

In addition to one or more of the features described above, or as an alternative, in further embodiments the first microstructure including a plurality of first grains and the second microstructure has a plurality of second grains, the plurality of second grains being smaller than the plurality of first grains.

In addition to one or more of the features described above, or as an alternative, in further embodiments operating the energy source with a first set of parameters forms the first portion of the component with a first surface roughness and first material strength and operating the energy source with a second set of parameters forms the second portion of the component with a second surface roughness and second material strength.

In addition to one or more of the features described above, or as an alternative, in further embodiments the component is a heat exchanger and the first portion of each of the plurality of layers includes at least one manifold of the heat exchanger and the second portion of each of the plurality of layers includes a core of the heat exchanger.

In addition to one or more of the features described above, or as an alternative, in further embodiments the energy source is a laser.

In addition to one or more of the features described above, or as an alternative, in further embodiments the first set of parameters and the second set of parameters include laser orientation, laser speed, laser power and a scanning strategy.

In addition to one or more of the features described above, or as an alternative, in further embodiments the powdered material is selected from metal, metal alloy, ceramic, polymer and a composite material.

In addition to one or more of the features described above, or as an alternative, in further embodiments each of the plurality of layers is formed sequentially.

According to another embodiment, a heat exchanger includes a core having a plurality of first layers for receiving a first fluid and at least one header arranged in fluid communication with the plurality of first layers. The at least one header is integrally formed with the core via an additive manufacturing process. The header has a first microstructure and the core has a second microstructure. The second microstructure is different than the first microstructure.

In addition to one or more of the features described above, or as an alternative, in further embodiments the first microstructure is optimized to avoid failure via a first failure mode and the second microstructure is optimized to avoid failure due to a second failure mode, distinct from the first failure mode.

In addition to one or more of the features described above, or as an alternative, in further embodiments the first failure mode is creep.

In addition to one or more of the features described above, or as an alternative, in further embodiments the second failure mode is fatigue.

In addition to one or more of the features described above, or as an alternative, in further embodiments the first microstructure includes a first grain size and the second microstructure includes a second grain size, the first grain size being larger than the second grain size.

In addition to one or more of the features described above, or as an alternative, in further embodiments a surface roughness of the core is different than a surface roughness of the at least one header.

In addition to one or more of the features described above, or as an alternative, in further embodiments a material strength of the core is different than a material strength of the at least one header.

In addition to one or more of the features described above, or as an alternative, in further embodiments the core further comprises a plurality of fins coupled to the plurality of first layers, wherein a thickness of at least one fin of the plurality of fins is dependent on an orientation of the fin relative to a build direction and at least one processing parameter used during formation of the at least one fin.

In addition to one or more of the features described above, or as an alternative, in further embodiments the at least one processing parameter include laser orientation, laser speed, laser power and a scanning strategy.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
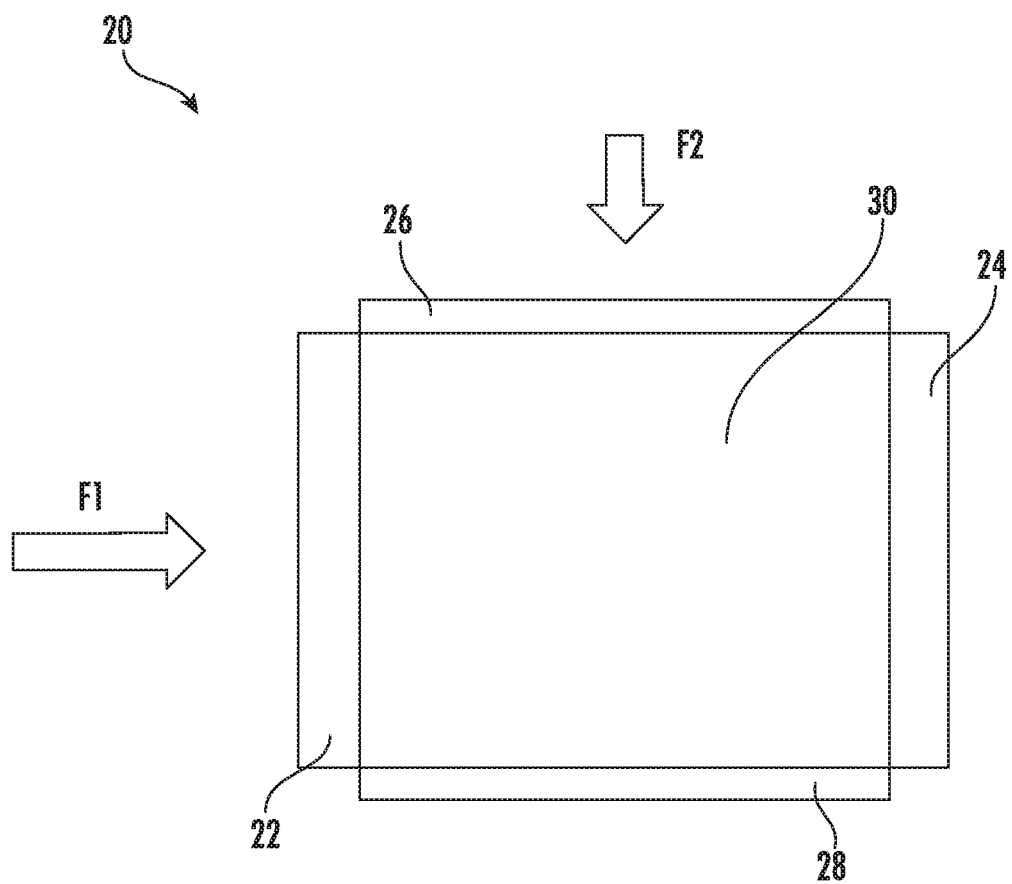
FIG. 1 is front view of a heat exchanger according to an embodiment.
Figure 2:
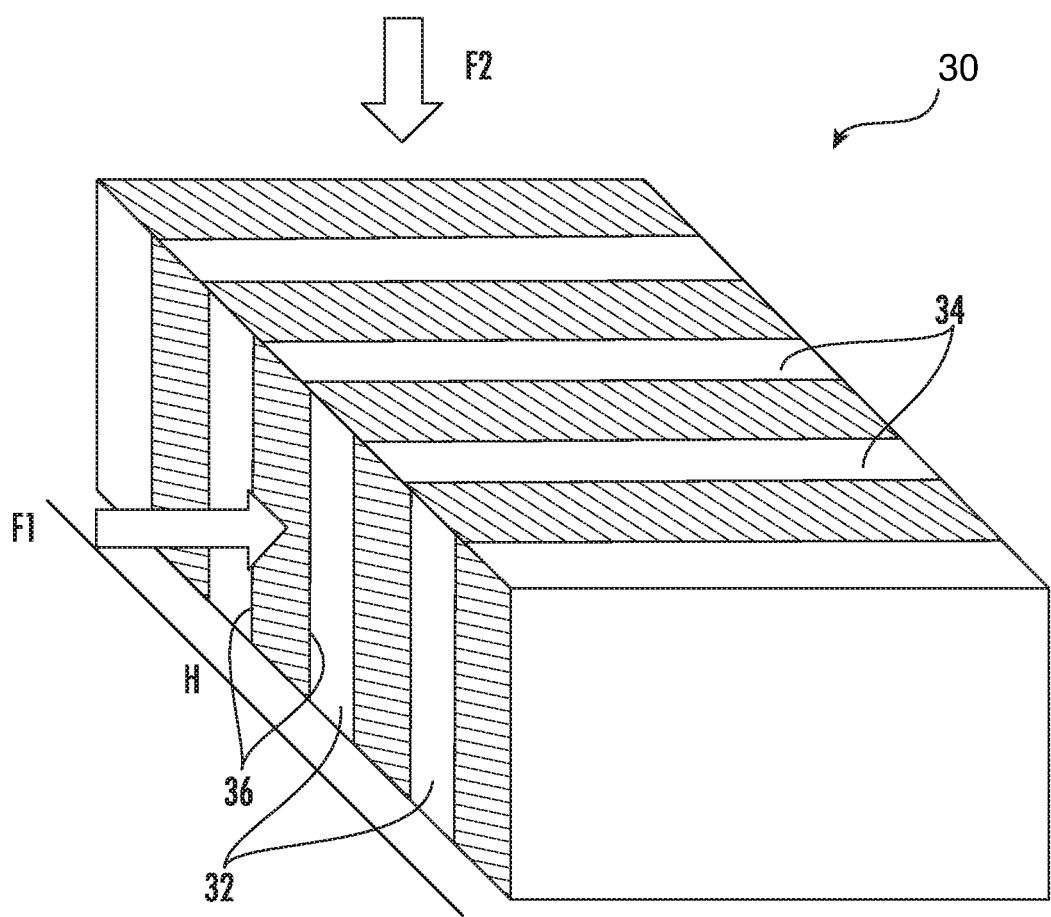
FIG. 2 is a perspective view of a core of the heat exchanger of FIG. 1 according to an embodiment.

With reference now to FIGS. 1 and 2, an example of a heat exchanger 20 configured to efficiently transfer heat from a first fluid to a second fluid is illustrated. The illustrated heat exchanger 20 is generally rectangular in shape; however, other shapes are also contemplated herein. A first fluid inlet header 22, an first fluid outlet header 24, a second fluid inlet header 26 and a second fluid outlet header 28 are arranged in fluid communication with a core 30 of the heat exchanger 20 such that heat is configured to transfer between the first fluid and the second fluid within the heat exchanger 20.

As illustrated, the first fluid inlet header 22 and the first fluid outlet header 24 are disposed adjacent opposite surfaces of the core 30. However, in other embodiments, such as where the first fluid flow within the heat exchanger 20 has a multi-pass configuration, the first fluid inlet header 22 and the first fluid outlet header 24 may be located adjacent the same surface of the core 30. Similarly, the second fluid inlet header 26 and the second fluid outlet header 28 are shown as being arranged adjacent opposing surfaces of the core 30, for example, a top and bottom of the core 30, respectively. However, in other embodiments, such as where the second fluid flow path through the heat exchanger 20 has a multi-pass configuration, the second fluid inlet and outlet headers 26, 28 may also be arranged on the same side of the core 30. It should be understood that a heat exchanger having any configuration where one or more fluids enter the core via at least one surface and exit the core via at least one surface is contemplated herein.

In the illustrated, non-limiting embodiment, the core 30 of the first heat exchanger 20 has a plate-fin construction with crossflow of a first warm fluid (first fluid) and a second cool fluid there through. However, a heat exchanger 20 having another type of construction may be used, including, but are not limited to, double pipe, shell and tube, plate, plate and shell, adiabatic shell, plate fine, pillow plate, and fluid heat exchangers.

As best shown in FIG. 2, the core 30 of the heat exchanger 20 includes a plurality of first fluid layers or segments 32 and second fluid layers segments 34. The first fluid layers 32 define a fluid pathway such that the first fluid is configured to flow through the core 30 in a first direction, indicated by arrow F1. The second fluid layers 34 define a fluid pathway such that the second fluid flows through the core 30 in a second direction, indicated by arrow F2. In one embodiment, the direction of the second fluid flow is substantially perpendicular to the direction of the first fluid flow. However, embodiments where the flows have other configurations, such as counter flow, or cross-counter flow for example are also contemplated herein. The first and second fluid layers 32, 34 are alternately stacked along the height H of the core 30. In an embodiment, thin plates 36 separate adjacent fluid layers 32, 34

Figure 3:
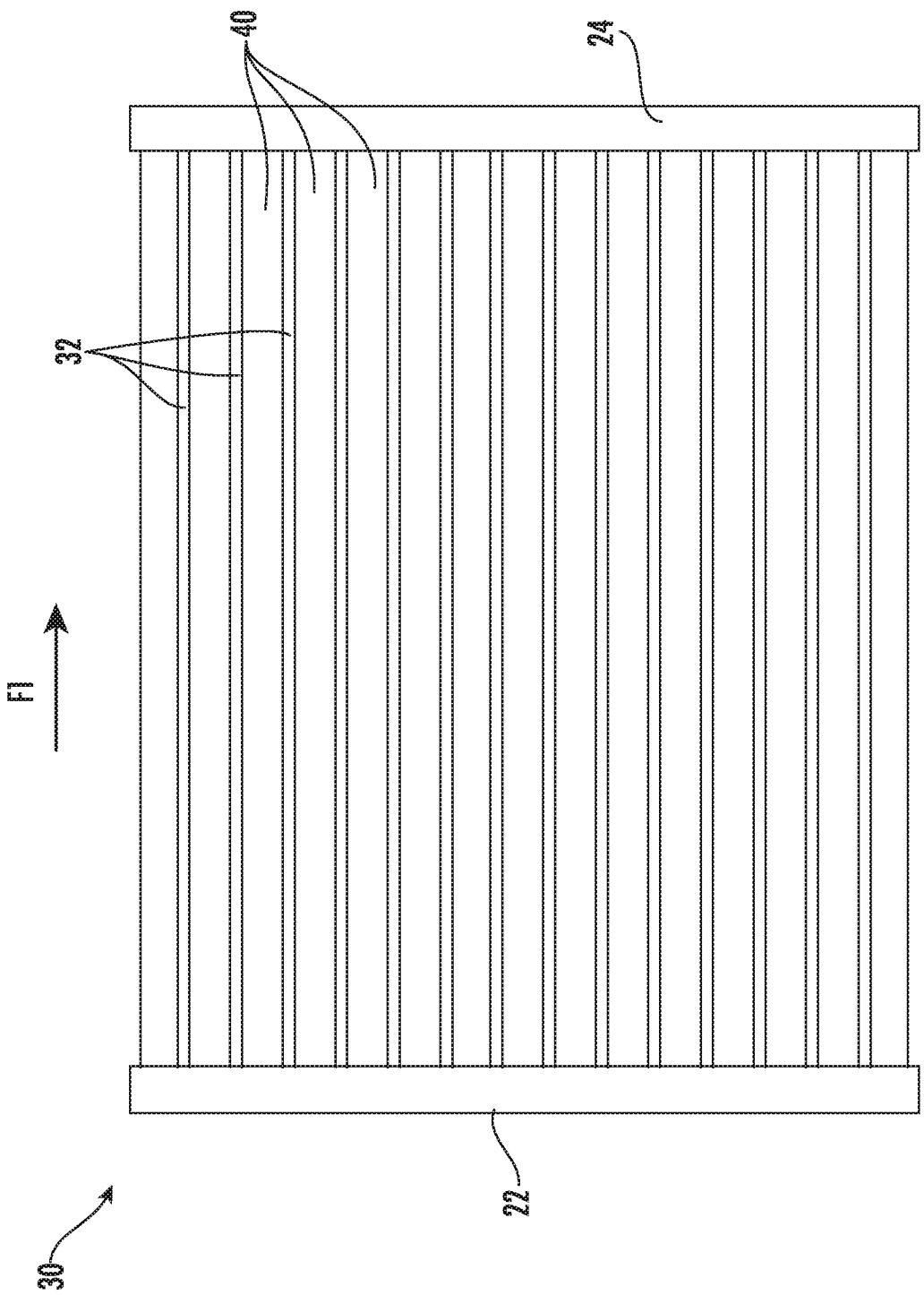
FIG. 3 is a cross-sectional view of the core of the heat exchanger of FIG. 2 according to an embodiment.

With specific reference to FIG. 3, a cross-sectional view of the heat exchanger core 30 of FIG. 2 taken in a plane perpendicular to the first fluid flow path is illustrated. As shown, each of the plurality of first fluid layers 32 includes an array of fins 40. The fins 40 may be brazed, soldered, welded, or otherwise coupled to a surface of at least one of the adjacent second fluid layers 34. The fins 40 act as a heat sink to increase the surface area of the second fluid layers 34 arranged in contact with the cool first fluid flow.

Different portions of the heat exchanger 20 are susceptible to different failure modes at different temperatures of operation. For example, the headers or manifolds 22, 24, 26, 28 of the heat exchanger 20 are more likely to fail as a result of creep (deformation due to the prolonged exposure of mechanical and thermal stresses acting thereon), whereas the layers 32, 34 within the core 30 of the heat exchanger 20 are more likely to fail due to fatigue, weakening of the material which occurs due to the cyclical application of loads. Accordingly, it is desirable to manufacture a heat exchanger 20 where each section or component thereof has a reduced likelihood of failure without overdesigning the heat exchanger.

Properties that are critical to performance of the heat exchanger 20 include material strength, surface roughness, and fin thickness. Accordingly, these properties may vary across the heat exchanger 20 to reduce the likelihood of failure of the heat exchanger 20. These properties may be selected to withstand the one or more failure modes associated with each section, location, or component of the heat exchanger 20. In an embodiment, this variation in one or more properties is achieved by forming the heat exchanger 20 through an additive manufacturing process, such as a laser power bed fusion process for example. However, it should be understood that other suitable additive manufacturing processes are also contemplated herein.

During an additive manufacturing process, energy from an energy source is applied to a generally powdered material, such as a powered metal, metal alloy, ceramic, polymer or composite material for example, to form a shape. Examples of the energy source include but are not limited to, an electron beam, a laser, or any other suitable energy source known to a person having ordinary skill in the art for example. The energy or heat from the energy source is configured to locally melt the powdered material such that the powdered material fuses into a substantially solid part to create a generally two-dimensional section of the component being formed. Through the additive manufacturing process, the plurality of components of the heat exchanger 20, i.e. the headers 22, 24, 26, 28 and the layers 32, 34 and fins 40 that define the core 30, may be integrally formed as a single unit. Alternatively, the components may be formed separately, such as through one or more additive manufacturing processes, and then connected to define the heat exchanger 20.

To manufacture the heat exchanger 20 such that each section or component of the heat exchanger 20 has optimized properties to withstand a known failure mode, one or more parameters of the additive manufacturing process may be controlled. In an embodiment, these controllable parameters may relate to the energy source and how energy is applied to the powdered material, such as such as laser orientation, laser speed, and laser power for example. Adjustment of such parameters may be used to optimize the material microstructure, and more specifically the grain size and grain orientation, at localized areas of the heat exchanger 20. For example, reducing the speed of the laser and increasing the power of the laser slows the solidification rate and increases the grain size of the portion of the heat exchanger being formed. In an embodiment, the processing parameters are controlled during the manufacture of the heat exchanger 20 so that portions of the heat exchanger 20 that are susceptible to creep (i.e. the manifolds 22, 24, 26, and 28) are formed having larger grains and portions of the heat exchanger that are susceptible to fatigue have smaller grains.

Manipulation of the microstructure not only changes the material properties of each section of the heat exchanger, but also improves the strength of the material, as needed. The material strength can be enhanced by controlling the directionality and refinement of the grain structure. In an embodiment, the material strength is improved by increasing the laser speed and reducing the laser power to produce elongated grains that extend in the direction of the build orientation. Further, the material fatigue properties can be improved by manipulating the laser parameters to make the grains as close to equiaxed as possible.

The pattern of movement of the laser during the additive manufacturing process, also referred to as a scanning strategy, can be used to control the geometry and surface finish of one or more portions of the heat exchanger. By controlling the surface roughness of the heat exchanger, the fluid pressure drop across the heat exchanger may be reduced and/or minimized In an embodiment, the laser is movable in a linear scanning pattern at the interface between the fins 40 and the adjacent layers 32, 34. The linear scanning pattern is intended to melt the fin area to achieve thinner walls and an enhanced surface finish. Alternatively, or in addition, the operational parameters of the laser applied to the interface between the manifolds 22, 24, 26, 28 and the core 30 may be selected to produce equiaxed grain structure that is favorable for both fatigue and creep.

Figure 4:
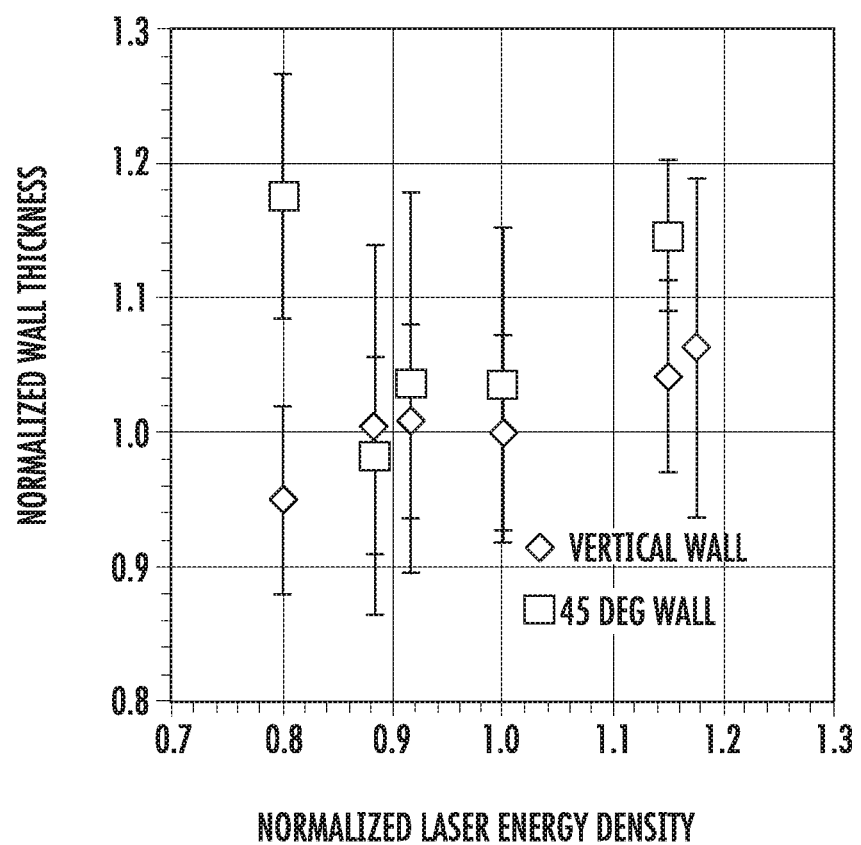
FIG. 4 is a graph comparing wall thickness and normalized energy density of a laser during an additive manufacturing process.
Figure 5:
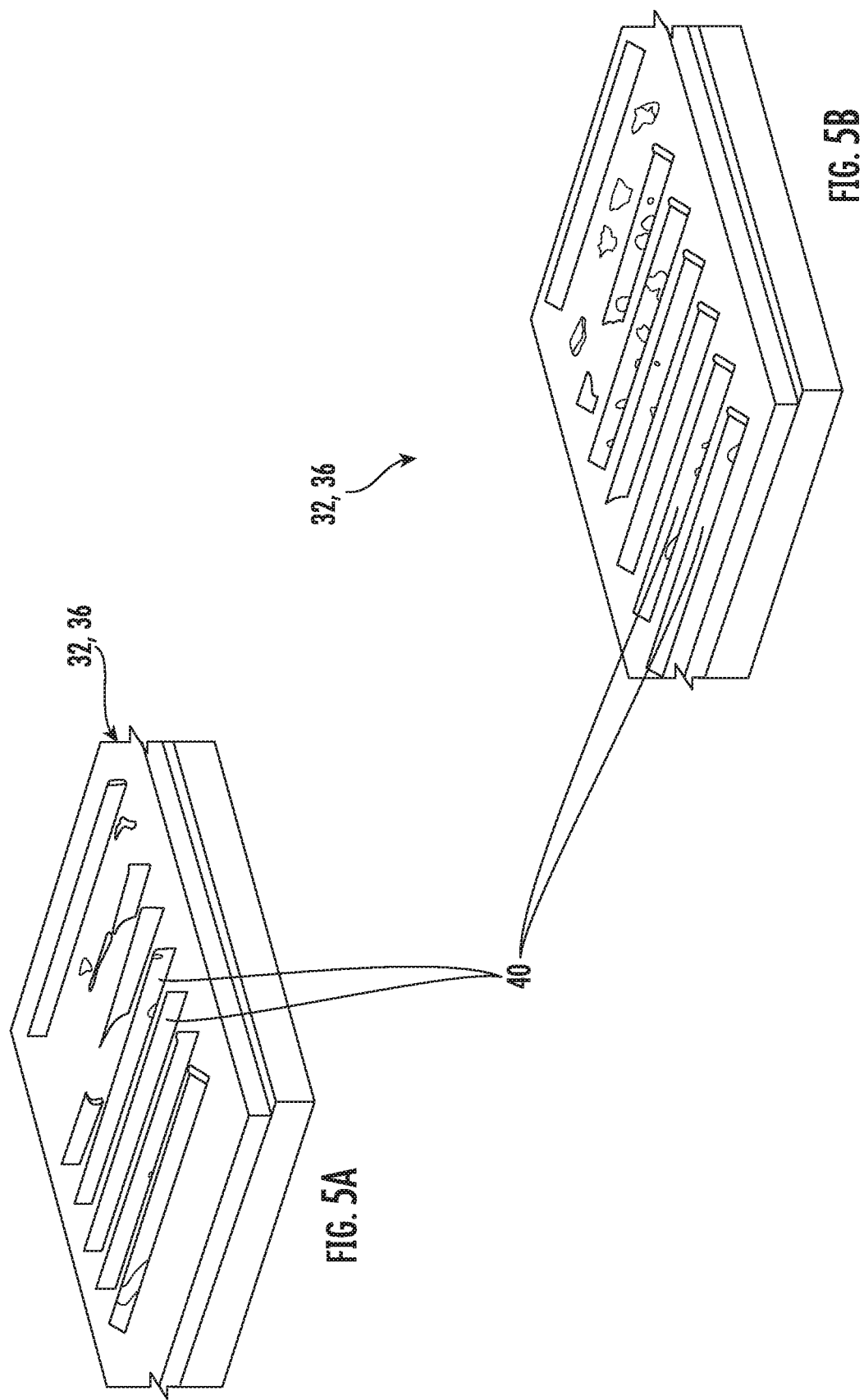
FIG. 5A is a perspective view of a layer of a heat exchanger core having a plurality of vertically oriented fins according to an embodiment.
FIG. 5B is a perspective view of a layer of a heat exchanger core having a plurality of angled fins according to an embodiment.

With respect to FIGS. 4-5, the thickness and uniformity of a feature, such as the fins extending from each layer of the core for example, are also dependent on the processing parameters and the orientation of the feature with respect to the build orientation. The graph of FIG. 4 illustrates the relationship between the thickness of a fin and the energy density (laser power/laser speed) used to fabricate the fin based on the geometry of the fin. As shown, the graph compares two similar fin configurations including vertically extending fins, shown in more detail in FIG. 5A and fins that are oriented at a 45° angle, shown in more detail in FIG. 5B. Accordingly, depending on fin orientation with respect to the build orientation, different fins located at different areas of the heat exchanger will have different wall thicknesses. Therefore, the use of geometry specific process parameters enables control of wall thickness and uniformity throughout the heat exchanger.

Figure 6:
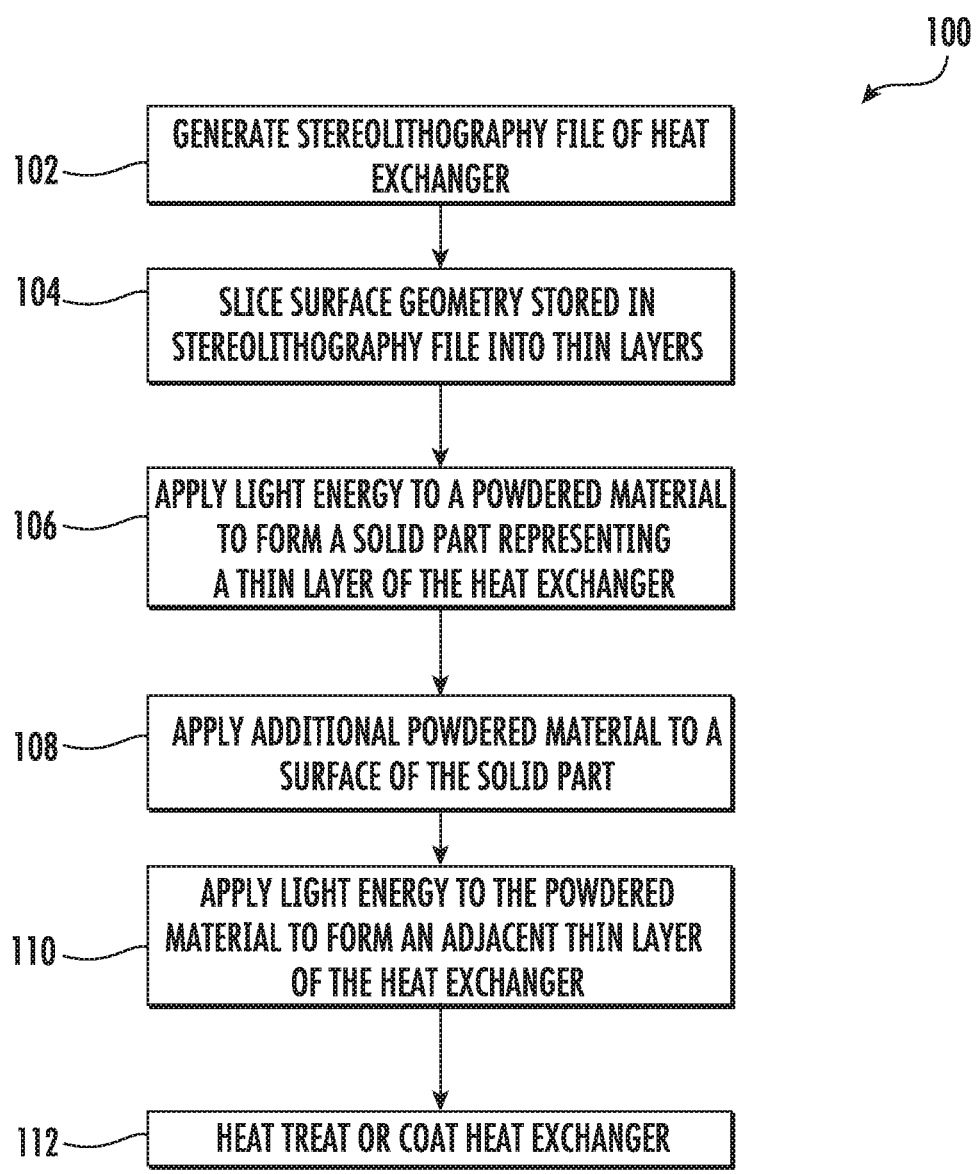
FIG. 6 is a flow diagram illustrating a method of manufacturing a heat exchanger via an additive manufacturing process according to an embodiment.

Referring now to FIG. 6, a method 100 of fabricating a heat exchanger 20 is described. In block 102, a stereolithography file that describes the geometry of the heat exchanger 20 is generated, for example based on a three dimensional model of the heat exchanger 20 created using a computer aided design (CAD) software. In an embodiment, the file comprises a compilation of a plurality of files. Each of the plurality of files is associated with a portion of component of the heat exchanger and includes a geometry, laser parameters and scanning strategies associated with the manufacture thereof. The stereolithography file is provided as an input to a pre-processing software configured to slice the surface geometry of the heat exchanger 20 into a plurality of thin layers, as illustrated in block 104. The thickness of each of the plurality of thin layers will vary depending on the specific additive metal fabrication process used, as well as the size of the heat exchanger 20.

In block 106, after the model of the heat exchanger 20 has been sliced into a plurality of layers, energy from an energy source is applied to a powdered material on a surface, such as a build platform for example to create a generally two-dimensional section representing a thin layer of the heat exchanger 20. Additional powdered material is arranged on a surface of the fused solid part in block 108. Similar to block 106, in block 110, energy from the energy source is again applied to the powered material to form an adjacent thin layer of the heat exchanger 20. The addition of powered material in block 108 and the application of energy to the powered material in block 110, is generally repeated until each of the plurality of thin layers of the heat exchanger model has been created.

Because the layers of the heat exchanger 20 are built sequentially, each thin layer is integrally formed with at least one adjacent thin layer to form a unitary heat exchanger 20. In one embodiment, the heat exchanger 20 may be heat treated to eliminate residual stresses in the heat exchanger 20, as illustrated in block 112. In another embodiment, a protective coating may be applied to the heat exchanger 20, in block 112, based on the intended application of the heat exchanger 20.

By forming a heat exchanger 20 using an additive metal fabrication process, different portions of the heat exchanger 20 may be formed with an optimized material strength, surface roughness, and fin thickness suitable to overcome expected failure modes. In addition, fabrication using an additive process offers significant advantages over conventional methods in both production time and cost.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger comprising:
   a core having a plurality of first layers for receiving a first fluid; and
   at least one header arranged in fluid communication with the plurality of first layers, the at least one header being integrally formed with the core via an additive manufacturing process, wherein the header has a first microstructure and the core has a second microstructure, the second microstructure being different than the first microstructure.

2. The heat exchanger of claim 1, wherein first microstructure is optimized to avoid failure via a first failure mode and the second microstructure is optimized to avoid failure due to a second failure mode, distinct from the first failure mode.

3. The heat exchanger of claim 2, wherein the first failure mode is creep.

4. The heat exchanger of claim 2, wherein the second failure mode is fatigue.

5. The heat exchanger of claim 1, wherein the first microstructure includes a first grain size and the second microstructure includes a second grain size, the first grain size being larger than the second grain size.

6. The heat exchanger of claim 1, wherein a surface roughness of the core is different than a surface roughness of the at least one header.

7. The heat exchanger of claim 1, wherein a material strength of the core is different than a material strength of the at least one header.

8. The heat exchanger of claim 1, wherein the core further comprises a plurality of fins coupled to the plurality of first layers, wherein a thickness of at least one fin of the plurality of fins is dependent on an orientation of the fin relative to a build direction and at least one processing parameter used during formation of the at least one fin.

9. The heat exchanger of claim 8, wherein the at least one processing parameter include laser orientation, laser speed, laser power and a scanning strategy.

* * * * *